Aug. 18, 1959    A. ZITTRELL ET AL    2,900,059
SYNCHRONIZING DEVICE
Filed Jan. 28, 1954
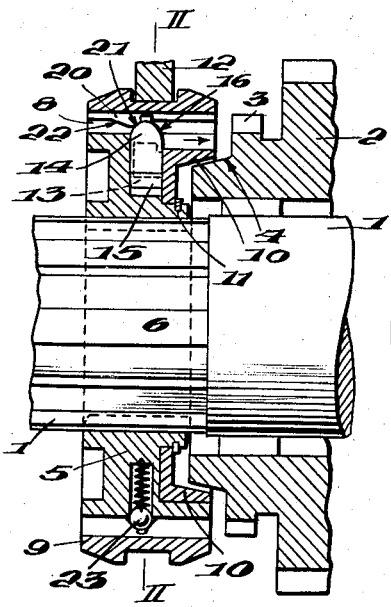
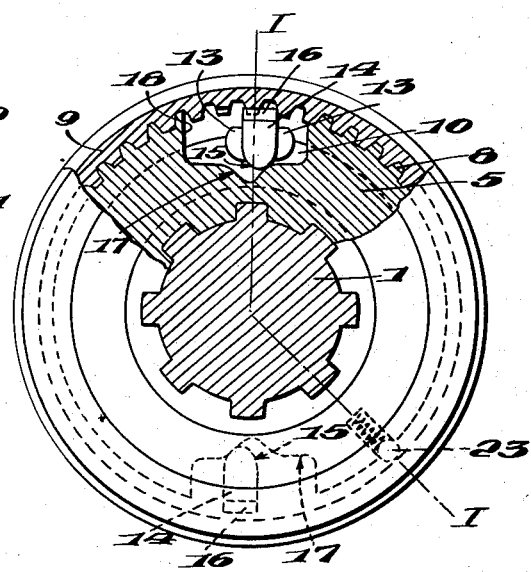
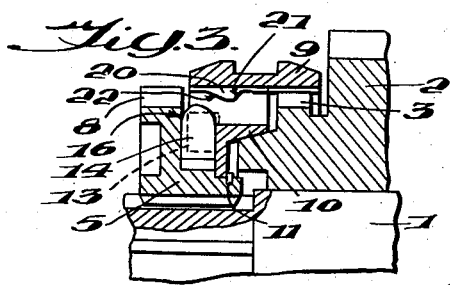
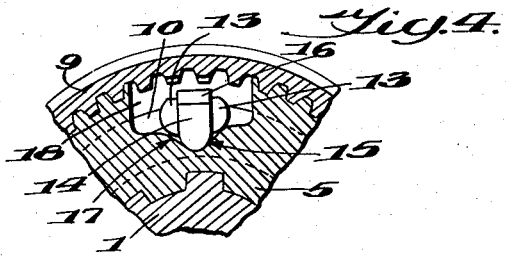
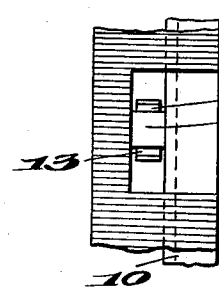
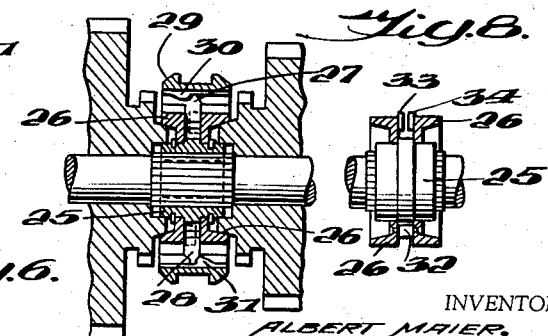
INVENTORS
ALBERT MAIER,
ANTON ZITTRELL,
BY
ATTORNEYS

United States Patent Office 2,900,059
Patented Aug. 18, 1959

2,900,059

SYNCHRONIZING DEVICE

Anton Zittrell and Albert Maier, Friedrichshafen am Bodensee, Germany, assignors to Zahnradfabrik Friedrichshafen, Friedrichshafen am Bodensee, Germany Application January 28, 1954, Serial No. 406,797

2 Claims. (Cl. 192—53)

This invention relates to an improved synchronisation device, more particularly for vehicle gear shift clutches, with a friction shift member and a push dog sleeve which can be locked until synchronism is reached. In contradistinction to hitherto known constructions, the device is distinguished by particular simplicity of construction of its component parts, the locking members used being large and therefore stable and also providing good guidance so that a constantly reliable working effect is ensured for a long period of operation with very little attention.

The most important features of the improved synchronisation device are the following:

The locking members are so guided as to be radially movable on the friction ring which is so maintained as to be freely rotatable within the inner part of the gear-shift sleeves; the said locking members have at each end sloping rounded surfaces, the inwardly directed ends of which fit opposite surfaces which are situated on the inner portion of the gear shift sleeve and are effective in the peripheral direction, while the outwardly directed ends meet opposite surfaces of the push dog sleeve, which are effective in the axial direction. The opposite surfaces arranged in the inner part of the gear-shift sleeve are formed in marginal recesses of the said inner part which allow space for partial rotation of the friction ring relatively to the inner part so as to permit radial movement of the locking members during the rotation of the friction ring.

Further features and advantages of the invention will be apparent from the following description taken in conjunction with the accompanying drawings which illustrate diagrammatically and by way of example, two embodiments of the invention, and in which:

Fig. 1 shows a gear-shift clutch, having the synchronisation device, in a longitudinal section along the line I—I of Fig. 2, the clutch being shown in the disengaged position;

Fig. 2 is a cross-section along the line II—II of Fig. 1;

Fig. 3 is a part view, in longitudinal section, of Fig. 1 but with the clutch in the engaged position;

Fig. 4 is a cross-section of Fig. 3, corresponding to Fig. 2;

Fig. 5 shows a part view of the inside of the push dog sleeve;

Fig. 6 shows a part view externally of the inner part of the gear-shift sleeve and of the friction ring;

Fig. 7 shows a modified embodiment employing the synchronisation device in a duplicated arrangement of shifting clutches;

Fig. 8 shows component parts for the duplicated clutch in a slightly different arrangement.

In Figs. 1 to 6, on the main shaft 1 there is a freely rotatable gearwheel 2 which is to be coupled with the shaft and has for this purpose a toothed rim 3 and a coned friction surface 4. Opposite this gearwheel the gear-shift sleeve 5 is guided to be longitudinally displaceable along that part of the shaft 1 which has keys 6.

The inner part of the gear-shift sleeve 5 has on its periphery toothing 8 corresponding to the toothed crown 3 of the gearwheel 2. On the toothing 8 is secured a longitudinally displaceable push dog sleeve 9 which can be slid over the dog crown 3 in order to drive the gearwheel. The push dog sleeve has an annular groove in which a shifting member 12 engages. The inner part 5 of the gear-shift sleeve has a freely rotatable friction ring 10 which is secured to the sleeve portion 5 by a circlip 11. At suitable places, for example at two diametrically opposite places on its periphery, the friction ring 10 has pairs of guiding cheeks 13 each containing a radially displaceable prismatic locking member 14. Each locking member has ends consisting of sloping rounded surfaces 15 and 16 respectively. By means of the inwardly directed end of each locking member, the sloping rounded surfaces 15 are intended to be able to co-operate with corresponding opposite surfaces 17 of recesses 18 in the inner part 5 of the gear-shift sleeve in such manner that, upon rotation of the friction ring 10 by a small amount and the carrying along therewith of the locking member 14, the latter is simultaneously so outwardly displaced that one of the sloping rounded surfaces 16 situated on the outside of the locking member can take up position in front of a projection 20 formed in the push dog sleeve. This projection 20 has a surface 21 corresponding to the shape of the locking members and also has a similar surface 22 towards its opposite side. The projections 20 are advantageously formed by the partial removal of one or two dog teeth from the push dog sleeve, as may be seen in Figs. 3 and 4. The construction may, however, be of another sort, if, where the recesses of the inner part of the gear-shift sleeve are situated, the push dog sleeve does not have continuous dog toothing but merely the aforesaid projections 20 with sloping surfaces. Means of known type may be provided to secure the inner part 5 of the gear-shift sleeve on the shaft 1 in the inoperative and the final coupling position. Similar means are also employed for securing the push dog sleeve 9 on the inner part 5 of the gear-shift sleeve in the positions shown in Figs. 1 and 2. Such means expediently consist of spring-urged locking members 23, as shown, for example, in Figs. 1 and 2, which are interposed between the inner part of the gear-shift sleeve and the outer gear-shift sleeve.

The method of operation of the synchronisation device is as follows: If the gear-shift sleeve 5 is displaced from the inoperative position shown in Fig. 1 in the direction of the arrow shown, the coned friction surface of the friction ring 10 first comes into contact with the coned friction surface 4 of the gearwheel 2. With increasing shifting pressure the locking members 14 are at first still maintained in the outer position. But as soon as synchronism has been reached between the friction ring 10 and the gearwheel 2, the locking members 14 can yield inwardly into the position shown in Fig. 4 under the maintained shifting pressure, which is now only exerted on the sliding gear-shift sleeve 9, so that the sliding gear-shift sleeve 9 finally becomes free to slide over on to the dog crown 3 of the gearwheel and the final coupling is effected. In the disengaging action the slipping surfaces 22 serve to thrust back the locking members 14. The latter may also be spring-urged outwardly.

In the duplicated arrangement of shifting clutches shown in Fig. 7, the inner part of the gear-shift sleeve, which in this case has the reference 25, has a friction ring 26 on each of its two sides, while distributed along the periphery are, for example, four locking members, one pair 27, 27 of which is intended for one clutch, while the other pair 28, 28 is intended for the other clutch. The sliding gear-shift sleeve 29 accordingly has projections 30 on one side for one pair 27, 27 of locking members, while projections 31 are provided for the other pair 28, 28 of locking members. The two friction rings 26, 26 may be rigidly connected together according to Fig. 8 with the aid of clamp bolts 32. In this case the opposite inner surfaces each have pairs of guide cheeks, 33, 34, between which the locking members 27, 28 are enclosed, but in such manner that they can be displaced radially. The construction of Fig. 8 has the advantage that the friction rings 26, 26 maintain themselves in the necessary central position without having to be secured against displacement by circlips or the like.

What we claim is:

1. A clutch comprising a coupling sleeve and a driving gear having interengageable teeth, said coupling sleeve having toothed engagement with and being slidably carried on an inner concentric synchronizing sleeve, a friction drive element concentrically carried by said synchronizing sleeve and having limited relative rotation with respect thereto, said friction element being engageable, upon manual shifting of said coupling sleeve, with a complementary friction element carried by said driving gear, a cam notch in said synchronizing sleeve, a radially movable locking pin having an inner cam follower engageable with said cam notch so as to be moved radially upon relative rotation between the friction element carried by said synchronizing sleeve and said synchronizing sleeve, and a protuberance inside said coupling sleeve engageable with the outer end of said pin to lock said coupling sleeve against longitudinal motion prior to synchronization of speed between said coupling sleeve and said driving gear, wherein the protuberance inside said coupling sleeve is provided with cam sides sloping in opposite directions and engageable with respective sloping sides provided on the outer end of said locking pin when said coupling sleeve moves in either direction with respect to said driving gear, said cam sides being of unequal slope, one slope to effect greater resistance to movement of said coupling sleeve when moved in the direction of coupling and the other slope to effect lesser resistance to motion of said coupling in the uncoupling direction.

2. A clutch comprising a coupling sleeve and a driving gear having inter-engageable teeth, said coupling sleeve having toothed engagement with and being slidably carried on an inner concentric synchronizing sleeve, a friction drive element concentrically carried by said synchronizing sleeve and having limited relative rotation with respect thereto, said friction element being engageable, upon manual shifting of said coupling sleeve, with a complementary friction element carried by said driving gear, a cam notch in said synchronizing sleeve, a radially movable locking pin having an inner cam follower engageable with said cam notch so as to be moved radially upon relative rotation between the friction element carried by said synchronizing sleeve and said synchronizing sleeve, and a protuberance inside said coupling sleeve engageable with the outer end of said pin to lock said coupling sleeve against longitudinal motion prior to synchronization of speed between said coupling sleeve and said driving gear, wherein said first mentioned friction element is provided with a pair of interiorly flattened guide cheeks effecting an open-sided channel, said locking pin being reciprocal in said channel and retained at the open side thereof by sliding engagement with a radial wall of said synchronizing sleeve, and said cam notch is substantially centered intermediate recessed areas on each side thereof to effect predetermined limits of relative rotary motion between said first mentioned friction element and said synchronizing sleeve.

References Cited in the file of this patent

UNITED STATES PATENTS

| 2,201,169 | Griswold | May 21, 1940 |
| 2,221,898 | Orr | Nov. 19, 1940 |
| 2,338,428 | Guter et al. | Jan. 4, 1944 |

FOREIGN PATENTS

| 52,118 | France | Aug. 17, 1943 |
| 57,042 | Holland | Mar. 15, 1946 |